US008223779B2

(12) United States Patent
Carroll et al.

(10) Patent No.: US 8,223,779 B2
(45) Date of Patent: Jul. 17, 2012

(54) SYSTEMS AND METHODS FOR PARALLEL MULTI-CORE CONTROL PLANE PROCESSING

(75) Inventors: Jon Thomas Carroll, Milton, GA (US); Satish Mysore Gopalakrishna, Alpharetta, GA (US); Matthew Connolly, Canton, GA (US)

(73) Assignee: Ciena Corporation, Linthicum, MD (US)

( * ) Notice: Subject to any disclaimer, the term of this patent is extended or adjusted under 35 U.S.C. 154(b) by 1054 days.

(21) Appl. No.: 12/027,904

(22) Filed: Feb. 7, 2008

(65) Prior Publication Data
US 2009/0202240 A1    Aug. 13, 2009

(51) Int. Cl.
*H04L 12/28* (2006.01)
*H04L 12/56* (2006.01)
(52) U.S. Cl. ....................................................... 370/401
(58) Field of Classification Search .................. None
See application file for complete search history.

(56) References Cited

U.S. PATENT DOCUMENTS

| 7,613,150 | B2 * | 11/2009 | Nagarajan et al. | 370/331 |
|---|---|---|---|---|
| 2004/0190902 | A1 * | 9/2004 | Tamai | 398/68 |
| 2006/0229861 | A1 * | 10/2006 | Tatsuoka et al. | 703/21 |
| 2006/0259630 | A1 * | 11/2006 | Shew et al. | 709/227 |
| 2007/0043964 | A1 * | 2/2007 | Lim et al. | 713/322 |
| 2007/0150895 | A1 * | 6/2007 | Kurland | 718/102 |

* cited by examiner

*Primary Examiner* — Chirag Shah
*Assistant Examiner* — Minh-Trang Nguyen
(74) *Attorney, Agent, or Firm* — Clements Bernard PLLC; Christopher L. Bernard; Lawrence A. Baratta, Jr.

(57) ABSTRACT

The present invention provides systems and methods for parallel multi-core control plane processing with optical networks. This enables optical switches utilizing control planes, such as G.ASON, to meet scalability and performance requirements of evolving networks. The multi-core processing is configured to handle call control for sub-network connections (SNCs) (e.g., requests for creates, failures, restores, routing). Additional control plane functions, such as signaling and related interfaces, routing connection admission control (CAC), naming and addressing, and the like, can also be processed in parallel.

20 Claims, 6 Drawing Sheets

SYSTEMS AND METHODS FOR PARALLEL MULTI-CORE CONTROL PLANE PROCESSING

FIELD OF THE INVENTION

The present invention relates generally to optical networks. More particularly, the present invention provides systems and methods for parallel multi-core control plane processing of sub-network connections in optical networks.

BACKGROUND OF THE INVENTION

Optical control plane implementations provide automated setup and control of services. Advantageously, control planes offer multi-vendor and inter-domain inter-working, enhanced service offerings such as Ethernet over SONET/SDH or Optical Transport Network (OTN), end-to-end service activation, cross-domain provisioning of switched connection services, fast mesh restoration, and the like. Traditionally, creating traffic paths through a series of Network Elements (NEs) has involved configuration of individual cross-connects on each NE. Control planes allow a user to specify a start point, an end point, and bandwidth required, and an agent on the Network Elements allocates a path through the network, provisioning the traffic path, setting up cross-connects, and allocating bandwidth from the paths for the user requested service. The actual path that the traffic will take through the network is not specified by the user.

Several control plane standards for optical networks exist including ITU-T Automatically Switched Optical Network (ASON), IETF Generalized Multi-Protocol Label Switching (G-MPLS) also known as Automatic Switched Transport Network (ASTN), and Optical Internetworking Forum (OIF) User-Network Interface Signaling Specifications (UNI) and Inter-Carrier Network Interface Signaling Specification. ASON specifications generally define an optical control plane communication framework. G-MPLS defines control plane discovery, routing, and signaling protocols. OIF UNI/E-NNI specifications define protocol extensions for multi-vendor interoperability.

The requirements for automatically switched optical networks (G.ASON) are outlined in ITU G.807/Y.1302. The control plane functions for the G.ASON network are defined for Signaling and Related Interfaces, Routing Connection Admission Control (CAC), Naming and addressing, etc. Conventionally, implementation of these functions, particularly routing and connection admission control, has typically been handled as a serial process. For example, current software architectures for optical switches are designed for a single processor system. These include individual software managers that handle functional areas. For instance, a routing protocol (e.g., Optical Signaling and Routing Protocol (OSRP)) and call control is handled by one process called a Call Handler Agent. This agent receives all requests for creation, failures, restoration, routing, and performs the appropriate actions to handle them.

Current processor development is running up against physical limitations. This is preventing further performance enhancements to a single processor. The hardware industry is therefore moving to multiple cores running together on a single processor to get continued performance improvements. Carriers and other service providers are continuously in the midst of major network expansions adding more and more optical network elements. Their networks are often dependent on G.ASON architecture such as OSRP to manage and protect their traffic. Disadvantageously, in many cases, carriers and other service providers are approaching the scalable limits of conventional software and hardware architecture for control plane processors.

The approach using a single call handler agent works fine with a single processing core. The monolithic task runs on the processor and maximizes central processor unit (CPU) utilization during failure recovery situations. An Optical Switch can control the different functional areas by setting priorities to tasks that determine which task is the most important. This task then gets to run based on it priority. However, this implementation does not scale, and is a significant constraint on network growth.

BRIEF SUMMARY OF THE INVENTION

In various exemplary embodiments, the present invention provides systems and methods for parallel multi-core control plane processing with optical networks. This enables optical switches utilizing control planes, such as G.ASON, to meet scalability and performance requirements of evolving networks. The multi-core processing can be configured to handle call control for sub-network connections (SNCs) (e.g., requests for creates, failures, restores, routing). Additional control plane functions, such as signaling and related interfaces, routing connection admission control (CAC), naming and addressing, and the like, can also be processed in parallel.

In an exemplary embodiment of the present invention, a controller configured for parallel multi-core control plane processing includes an external interface configured to receive a control plane request for a sub-network connection; and one or more processor cores configured to process the control plane request for the sub-network connection through parallel processing, wherein an operating system is configured to operate on the one or more processor cores and to manage the parallel processing of the control plane request sub-network connection. Optionally, the parallel processing includes running the control plane request for the sub-network connection as a single process on one of the one or more processor cores; and wherein the operating system is configured to select the one of the one or more processor cores for the single process. The operating system can select the one of the one or more processor cores based on one of round robin and priority-based. Alternatively, the parallel processing includes running the control plane request for the sub-network connection on multiple threads of the one or more processor cores. The operating system can be configured to assign the control plane request for the sub-network connection to the multiple threads based on loads associated with the one or more processor cores. Optionally, the control plane request for the sub-network connection includes functional area tasks of call control; and wherein the parallel processing includes dividing the functional area tasks into different processes for operation on the one or more processor cores. The operating system can be configured to assign the different processes to one or more of the one or more processor cores.

In another exemplary embodiment of the present invention, a network element configured for parallel multi-core control plane processing includes a line module; a switch module interconnected with the line module; and a controller in communication with the line module and the switch module, wherein the controller includes an external interface configured to receive a control plane request for a sub-network connection; and one or more processor cores configured to process the control plane request for the sub-network connection through parallel processing, wherein an operating system is configured to operate on the one or more processor cores and to manage the parallel processing of the control plane request of the sub-network connection. Optionally, the parallel processing includes running the control plane request for the sub-network connection as a single process on one of the one or more processor cores; and wherein the operating system is configured to select the one of the one or more processor cores for the single process. The operating system can select the one of the one or more processor cores based on one of round robin and priority-based. Alternatively, the parallel processing includes running the control plane request for the sub-network connection on multiple threads of the one or more processor cores. The operating system can be configured to assign the control plane request for the sub-network connection to the multiple threads based on loads associated with the one or more processor cores. Optionally, the control plane request for the sub-network connection includes functional area tasks of call control; and wherein the parallel processing includes dividing the functional area tasks into different processes for operation on the one or more processor cores. The operating system can be configured to assign the different processes to one or more of the one or more processor cores.

In yet another exemplary embodiment of the present invention, a method for parallel multi-core control plane processing includes receiving a control plane request for a sub-network connection; and processing the sub-network connection on a multi-core processor, wherein the processing is performed in parallel. Optionally, the sub-network connection is processed as a single process on one of one or more processor cores; and wherein an operating system is configured to select the one of the one or more processor cores for the single process. The operating system can select the one of the one or more processor cores based on one of round robin and priority-based. Alternatively, the sub-network connection is processed by running the sub-network connection on multiple threads of one or more processor cores; and wherein an operating system is configured to assign the sub-network connection to the multiple threads based on loads associated with the one or more processor cores. Optionally, the sub-network connection includes functional area tasks of call control; and wherein the functional area tasks of call control are divided into different processes for operation on one or more processor cores. An operating system can be configured to assign the different processes to one or more of the one or more processor cores.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides systems and methods for parallel multi-core control plane processing with optical networks. This enables optical switches utilizing control planes, such as G.ASON, to meet scalability and performance requirements of evolving networks. The multi-core processing is configured to handle call control for sub-network connections (SNCs) (e.g., requests for creates, failures, restores, routing). Additional control plane functions, such as signaling and related interfaces, routing connection admission control (CAC), naming and addressing, and the like, can also be processed in parallel.

Figure 1:
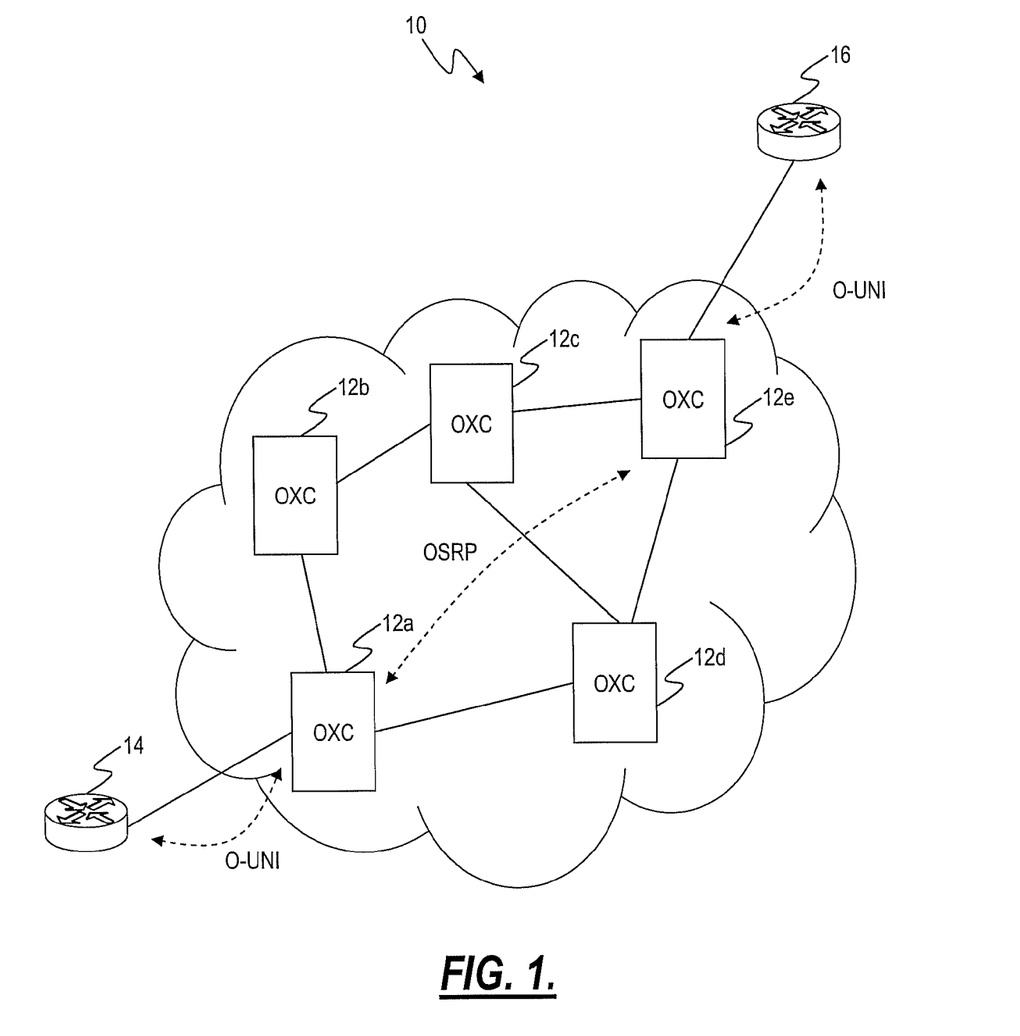
FIG. 1 is a diagram of an ASON network according to an exemplary embodiment of the present invention.

Referring to FIG. 1, an ASON network 10 is illustrated according to an exemplary embodiment of the present invention. The network 10 includes multiple interconnected optical switches (OXC) 12*a*-12*e* utilizing an optical control plane, such as ASON. The OXCs 12*a*-12*e* are network elements configured to provide optical switching at wavelength and sub-wavelength levels. For example, the OXCs 12*a*-12*e* can be configured to support SONET/SDH, Ethernet, Optical Transport Network (OTN), dense wave division multiplexing (DWDM), and the like. The network 10 also includes a first client 14 connected to the OXC 12*a*, and a second client 16 connected to the OXC 12*e*. For example, the clients 14,16 can include routers, switches, multi-service provisioning platforms (MSPPs), DWDM terminals, and the like.

The Optical Internetworking Forum (OIF) defines an Optical User to Network Interface (O-UNI) for an interface between a client network and an optical network. This further includes signaling and sub-network connection (SNC) connection creation, deletion, query, and the like, and does not provide topology information exchanged between the clients 14,16 and the network 10. Advantageously, O-UNI provides interoperability of intelligent optical networks with control plane messaging. For example, the clients 14,16 can request a connection to other clients, e.g. the client 14 can request over the O-UNI link to the OXC 12*a* a connection to the client 16.

The OXCs 12*a*-12*e* utilize the optical control plan to provide automated setup and control of services. Advantageously, control planes offer multi-vendor and inter-domain inter-working, enhanced service offerings such as Ethernet over SONET/SDH or Optical Transport Network (OTN), end-to-end service activation, cross-domain provisioning of switched connection services, mesh restoration, and the like. Traditionally, creating traffic paths through the series of OXC Network Elements (NEs) 12*a*-12*e* has involved configuration of individual cross-connects on each NE. Control planes allow a user to specify a start point, an end point, and bandwidth required, and an agent on the NEs 12*a*-12*e* allocates a path through the network, provisioning the traffic path, setting up cross-connects, and allocating bandwidth from the paths for the user requested service. The actual path that the traffic will take through the network 10 is not specified by the user.

The ASON network 10 can utilize OSRP based on ITU-T G.7713.1 for fast provisioning. ITU-T G.7713.1 is based on Asynchronous Transfer Mode (ATM) Forum Private Network-Node Interface (PNNI), modified for SONET/SDH/OTN. For routing, a PNNI link-state routing protocol has been extended to incorporate routing parameters specific to the optical transport domain. The routing functionality distributes network topology and state information among OXCs 12a-12e in the network 10, so the OXCs 12a-12e can determine optimal route based on predetermined policy. Typical routing functionality is supported, such as automatic advertisements between OXCs 12a-12e and bandwidth advertisements based on changes in the network 10. Using a combination of the signaling and routing protocols, OSRP can set up a light path, hereinafter referred to as an SNC, between any two OXCs 12a-12e. The clients 14,16 can request the SNC through the O-UNI connection, and OXCs 12a-12e can also request the SNC from one another.

The sub-network connection ("SNC") defines a grouping of one or more paths that pass through a network element (e.g., OXCs 12a-12e) in the network 10. A signaling and routing protocol (e.g., OSRP) is used to route, establish and maintain one or more SNCs in a given network element. The SNCs are characterized as path-based or composite. Path-based SNCs can include one or more synchronous transport signals (STS-1). A composite SNC can include multiple paths. SNCs define a temporary (e.g., over a short period of time, where the connection is set-up and torn down at each call) allocation of resources in the network. SNCs are provisioned when a call is made.

The routing for a SNC can be explicitly or automatically defined. Provisioning of SNCs is provided through the signaling and routing protocol (e.g., OSRP). Explicitly provisioned SNCs include user (e.g., system administrator)-defined routes. Automatically provisioned SNCs make use of a routing protocol for computing an optimal route. In either case, the route information is transmitted to other OXCs 12a-12e. The SNCs are said to be temporary in that, resources associated with the route (e.g., bandwidth) can be dynamically re-allocated along the path. The reconfiguration includes the clearing of the set up connection (e.g., freeing the resources at a given network element).

Network resources associated with the SNCs are dynamically reconfigurable. Accordingly, the failure at a single point along the path from an ingress network element (e.g., OXC 12a) to an egress network element (OXC 12e) defining the route does not result in unused and unavailable resources. In one implementation, a user (e.g., clients 14,16) can configure one or more of the following parameters associated with a SNC including a local line on which the SNC originates, the identification (ID) of the network element on which the SNC terminates, the ID of the remote line on which the SNC terminates, a class of service, a maximum allowable delay, route setting including working and protection routes, preferred status, mesh restorability, revert configurations upon fail over, and reversion timers.

In the present invention, the OXCs 12a-12e include a multi-core processor configured for parallel processing of SNCs. Each OXC 12a-12e includes a software architecture configured to operate on the multi-core processor to provide a highly scalable network. The multi-core processor enables the network 10 to scale in terms of the number of OXCs 12 supported to enable efficient processing of SNC requests.

Figure 2:
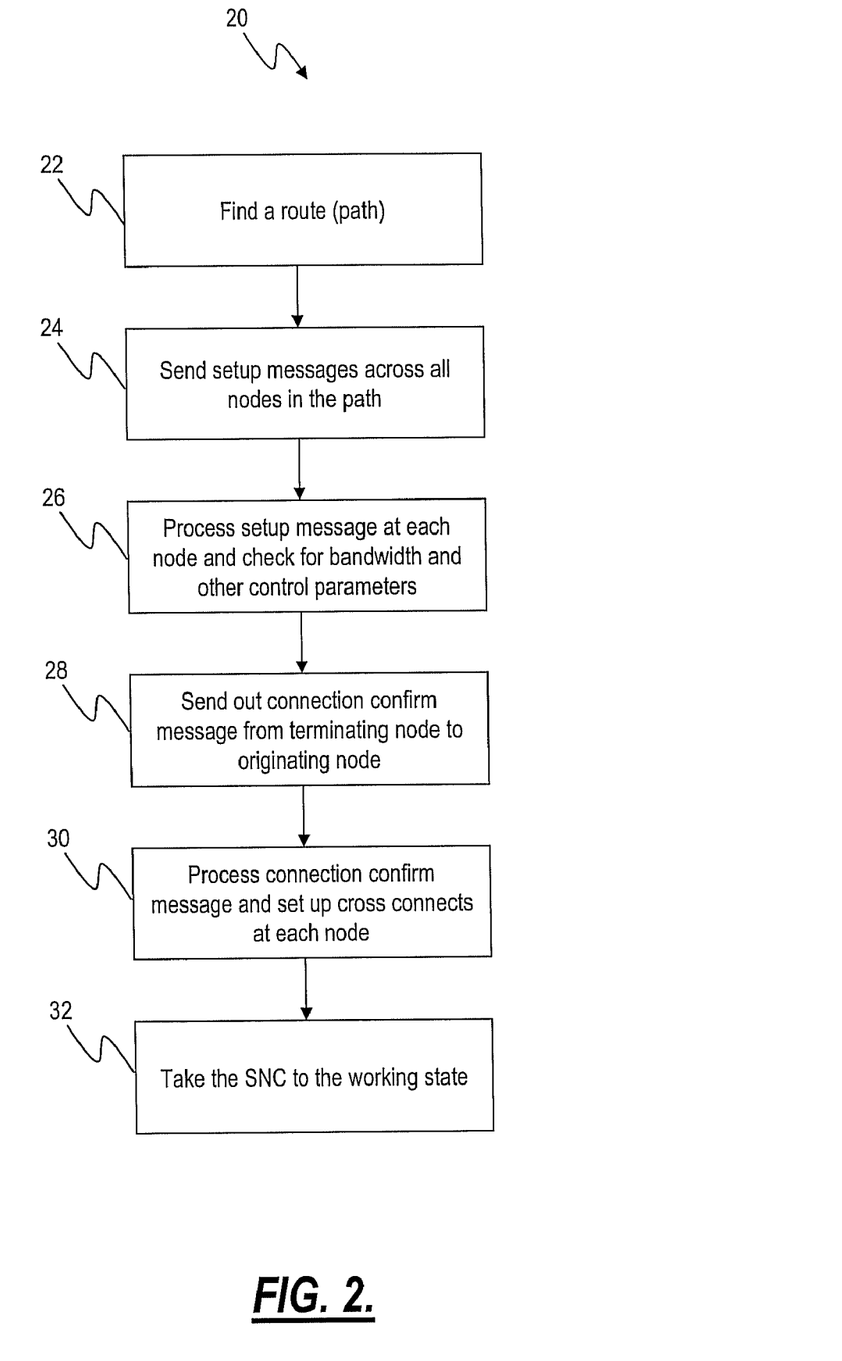
FIG. 2 is a flowchart illustrating sub-network connection (SNC) setup through multiple nodes according to an exemplary embodiment of the present invention.

Referring to FIG. 2, a flowchart illustrates SNC setup 20 through multiple nodes according to an exemplary embodiment of the present invention. For example, the SNC setup 20 can be utilized to setup SNCs on the OXCs 12a-12e in FIG. 1. First, the SNC setup 20 finds a route (path) through the multiple nodes (step 22). This can be based on available resources on connections between the nodes and other parameters. For example, a multi-core controller at each node can keep track of these resources and other parameters based on control plane signaling from all the nodes. Here, a route is found from the originating drop connection point to the terminating drop connection point within the constraint of a set of parameters which may include weights, number of hops, delay, protection parameters, class of service parameters, etc. to name a few.

Setup messages are sent across all nodes in the path (step 24). These messages are sent utilizing the control plane, i.e. a control plane signaling message from the originating node to the terminating node across all nodes that are included in the path found in step 22. Each node processes the setup message and checks for bandwidth and other control parameters (step 28). Here, the multi-core controller can perform the processing. When any node gets a control signaling message, it needs to verify if it has bandwidth currently available to satisfy the signaling control parameters and if so pass it on forward and if not, send a crank bank message. The basic idea of routing part of control plane is to avoid the crank bank message as much as possible.

A connection confirm message is sent from a terminating node to an originating node of the path (step 30). Each node in the path processes the connection confirm message and sets up cross connects (step 32). Again, this functionality can be performed by the multi-core controller. Once all the nodes across the path have the signaling message, step 32 sets up a cross connect automatically between the end points of interest at each node and then sends back a connect confirm message from terminating node to the originating node. Next, each node sets up a cross connect upon the receipt of this confirm message. Finally, the SNC is taken to the working state, i.e. placed in-service (step 34).

The SNC setup 20 can be handled by using two state machines at the control plane and one state machine at a data plane. The first one for the control plane is at the originating node to control the state of the SNC as a whole. The other one for the control plane is at each node through which the SNC is passing through to make sure that the cross connection is established or de-established to satisfy the whole SNC. The state machine at the data plane establishes the traffic at each node after the cross connection is setup by the control plane.

The present invention provides a multi-core controller for parallel processing of SNC setup 20. Advantageously, parallel processing separates the two state machines for the control plane in a clear and precise manner allowing the two state machines to run in parallel. This increases the speed at which the whole SNC can be brought to a working state. The parallel processing allows the two state machines to run in parallel to the state machine that runs at the data plane to establish traffic which provides faster traffic restoration, e.g. terms of approximately 30% to 40% improvement over conventional mechanisms. Also, parallel processing enables the control pane to scale the number of SNCs that can be mesh restored easily without any code change. Additionally, step 28 allows network operators a lot of flexibility to setup their networks in any manner and grow without issues in upgrading software.

Figure 3:
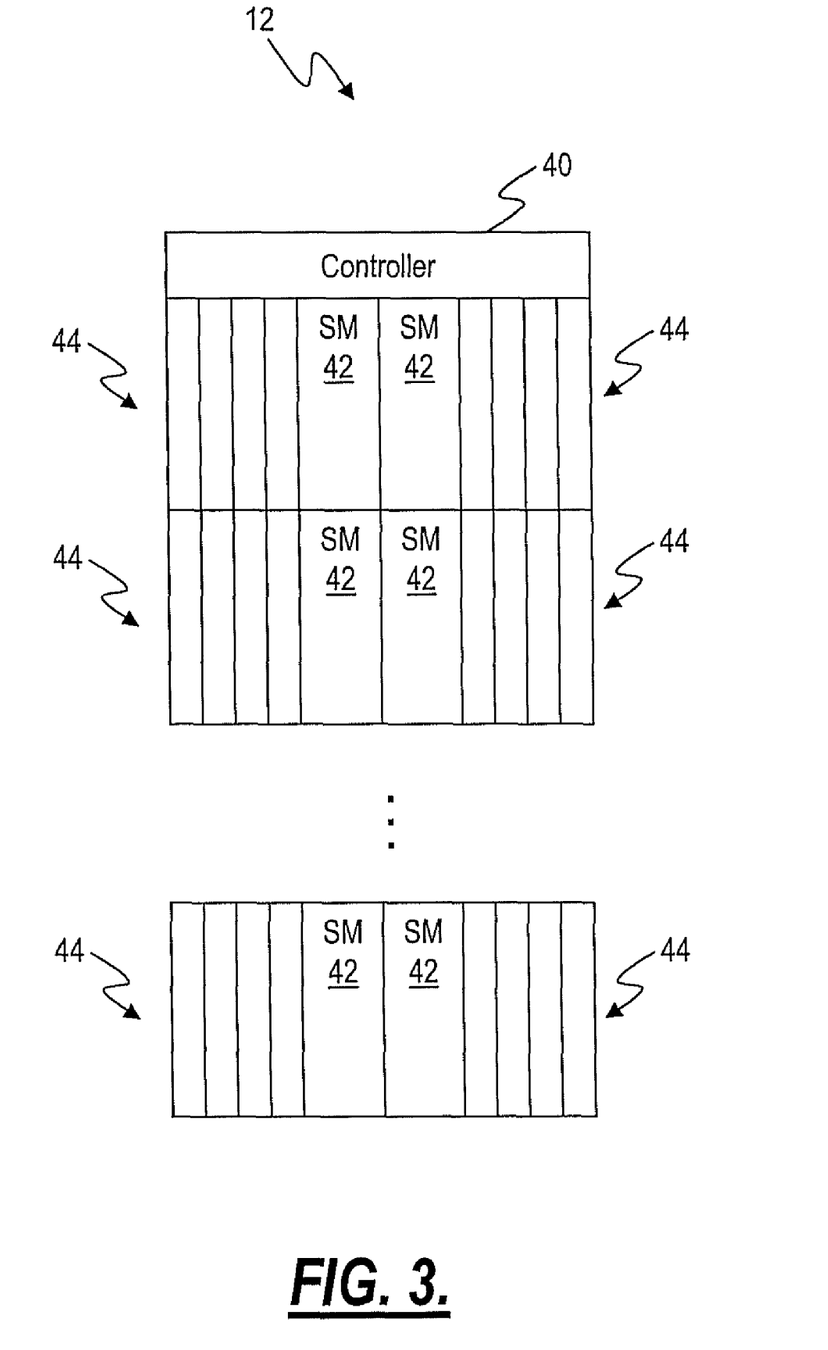
FIG. 3 is an optical switch (OXC) with a multi-core processor configuration in a controller according to an exemplary embodiment of the present invention.

Referring to FIG. 3, an optical switch (OXC) 12 with a multi-core processor configuration in a controller 40 is illustrated according to an exemplary embodiment of the present invention. The OXC 12 can include multiple switch modules 42 interconnected to multiple line modules 44. The switch modules 42 are configured to provide non-blocking switching at any granularity (wavelength, sub-wavelength, etc.). The line modules 44 are configured with multiple ports, such as optical ports for SONET/SDH, OTN, Ethernet, and the like. For example, the line modules 44 can provide DWDM connections between OXCs 12, such as in the network 10, and connections to clients, such as clients 14,16. The components (40, 42, and 44) are each in communication with one another, such as through a backplane, mid-plane, direct optical/electrical connections, and the like. In an exemplary embodiment, the OXC 12 includes a three-stage Clos switch. Those of ordinary skill in the art will recognize the systems and methods of the present invention can also apply to other switch configurations running optical control planes.

The controller 40 is configured to provide network element level operations, administration, maintenance, and provisioning (OAM&P) for the OXC 12 and for control plane operations. The controller 40 can include external interfaces to other controllers 40 on other OXCs 12 and to a management system, such as a network management system (NMS). The external interfaces can include an Ethernet connection, an out-of-band signaling channel, an in-band signaling channel, and the like.

Figure 4:
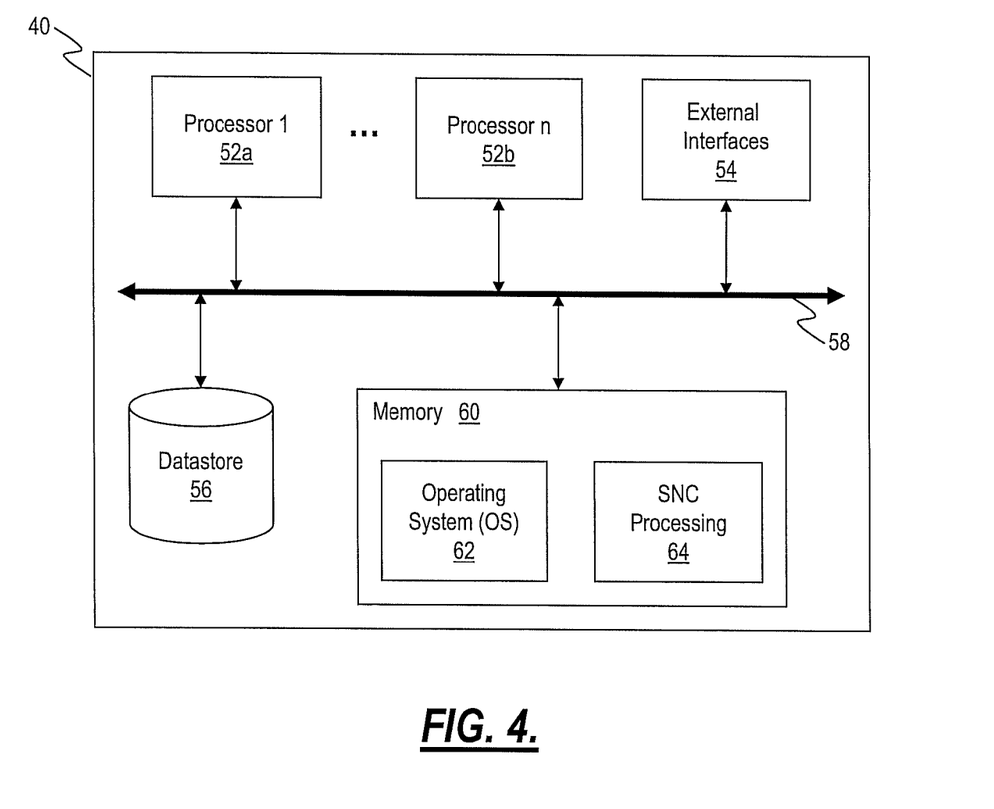
FIG. 4 is a block diagram of a multi-core controller configured to process SNCs in parallel according to an exemplary embodiment of the present invention.

Referring to FIG. 4, a block diagram illustrates a multi-core controller 40 configured to process SNCs in parallel according to an exemplary embodiment of the present invention. The controller 40 can be a digital computer that, in terms of hardware architecture, generally includes one or more processors 52*a,b*, external interfaces 54, a data store 56, and memory 60. In an exemplary embodiment, the controller 40 is connected to an OXC 12.

The components (52*a*, 52*b*, 54, 56, and 60) are communicatively coupled via a local interface 58. The local interface 58 can be, for example, one or more buses or other wired or wireless connections, as is known in the art. The local interface 58 can have additional elements, which are omitted for simplicity, such as controllers, buffers (caches), drivers, repeaters, and receivers, among many others, to enable communications. Further, the local interface 58 can include address, control, and/or data connections to enable appropriate communications among the aforementioned components.

The processors 52*a*,52*b* are hardware devices for executing software instructions. The processors 52*a*,52*b* can be any custom made or commercially available processor, a central processing unit (CPU), an auxiliary processor among several processors associated with the controller 40, a semiconductor-based microprocessor (in the form of a microchip or chip set), or generally any device for executing software instructions. When the controller 40 is in operation, the processors 52*a*,52*b* are configured to execute software stored within the memory 60, to communicate data to and from the memory 60, and to generally control operations of the controller 40 pursuant to the software instructions. Note, the controller 40 can include both multiple processors 52*a*,52*b* and multiple processor cores on each of the processors 52*a*,52*b*.

The external interfaces 54 are used to transmit/receive communications to/from other controllers 40 and management systems. The external interfaces 54 can include connections to a backplane, network connections such as Ethernet, and the like. The data store 56 can be used to store data. The data store 56 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 56 can incorporate electronic, magnetic, optical, and/or other types of storage media.

The memory 60 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 60 may incorporate electronic, magnetic, optical, and/or other types of storage media. Note that the memory 60 can have a distributed architecture, where various components are situated remotely from one another, but can be accessed by the processors 52*a*,52*b*.

The software in memory 60 can include one or more software programs, each of which includes an ordered listing of executable instructions for implementing logical functions. The software in the memory 60 can include a suitable operating system (O/S) 62 and a SNC processing agent 64. The operating system 62 essentially controls the execution of other computer programs, such as the SNC processing agent 64, and provides scheduling, input-output control, file and data management, memory management, and communication control and related services.

Figure 5:
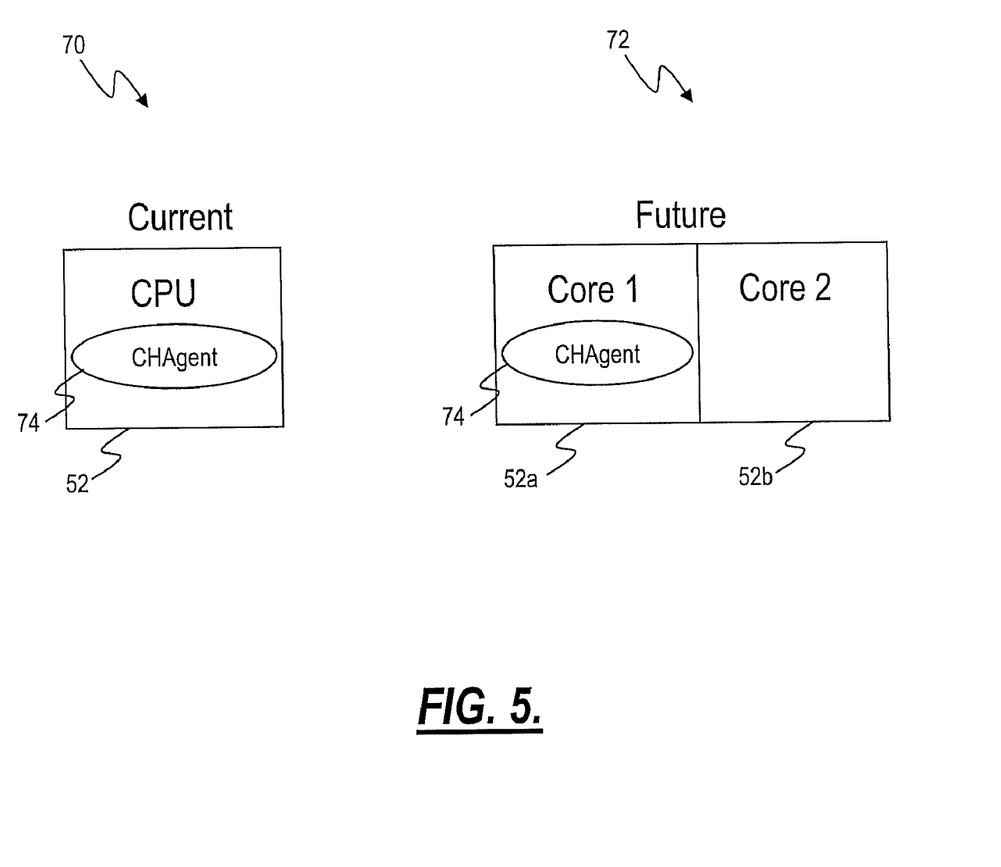
FIG. 5 are diagrams illustrating a call handler agent operating on a single processor and on multi-core processors.

Referring to FIG. 5, diagrams 70,72 illustrate a call handler agent 74 operating on a single processor 52 and on multi-core processors 52*a*,52*b*. The diagram 70 illustrates conventional controllers utilizing the single processor 52. Here, the call handler agent 74 is configured to manage all aspects of SNCs in serial, i.e. operating as a monolithic call handler agent 74. In diagram 72, the controller is shown with the multi-core processors 52*a*,52*b*. The multiple core processors 52*a*,52*b* only provide benefit when they can be used in parallel. Accordingly, the present invention takes serial processes associated with SNC processing and makes them run in parallel. Instead of having the monolithic call handler agent 74 process that manages all aspects of SNCs, the present invention creates small individual processes for each SNC. The operating system 62 can then divide them up on as many processor cores 52*a*,52*b* as exist in the current architecture and fully utilize all of the cores 52*a*,52*b*. Advantageously, as the controller is upgraded to include more cores 52*a*,52*b* (as the hardware progresses), the call handler agent 74 scales automatically.

Figure 6:
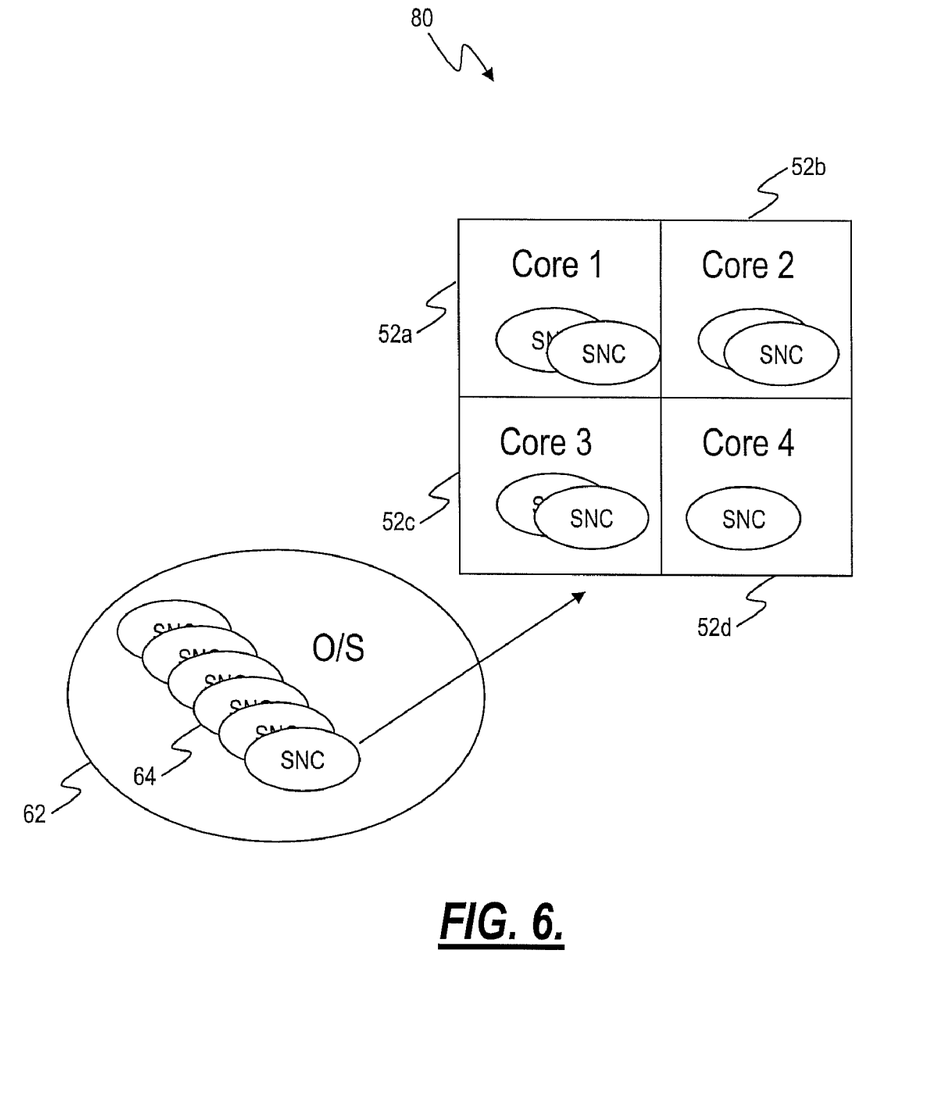
FIG. 6 is a logical diagram illustrating multi-core processing of SNCs according to an exemplary embodiment of the present invention.

Referring to FIG. 6, a logical diagram illustrates multi-core processing 80 of SNCs 64 according to an exemplary embodiment of the present invention. The present invention can utilize several implementations that can increase signaled network connections using parallel processing. Each of the SNC processing agents 64 include various functions associated with an SNC, such as requests for creates, failures, restores, routing, etc. For example, each SNC processing agent 64 can be configured to perform the SNC setup 20 functionality in FIG. 2.

As described in FIG. 2, there are a couple of state machines, two for the control plane and one for the data plane, for each SNC. Usually a few threads or tasks are assigned to handle each of the above state machines. All these tasks could be running in one processor or two processors. But irrespective of the number of processors, each task/thread is handling the state machine functionality for every SNC. That means if there are thousands of SNCs that need to be mesh restored at the same time, all these SNCs need to go over the state machines and hence the threads/tasks need to take every one of these SNCs through the state machines in a sequential manner.

In an exemplary embodiment, call control and routing functions in the SNC processing agents 64 act similar to conventional mechanisms but operate on different processors. Here, each SNC agent 64 runs as a single process on each processor. The O/S 62 includes a mechanism to assign individual SNCs 64 to a given processor core 52*a*-52*d* using a job distribution function. Exemplary job distribution functions can include round robin, priority based, or some other assignment scheme as is known in the art. This is the simplest implementation, but may not be the most efficient.

Here, the present invention assigns SNCs and their state machines (i.e., one, two, three, or a combination thereof with respect to a SNC) to a single core of a multi-core processor. Accordingly, many cores of multi processors could be processing state machines for different SNCs concurrently. For example, many SNCs are mesh restored in parallel instead of in a sequential manner. The implementation includes finding out which core is free to take up a task and designing the state machines along with the task in such a manner that irrespective of which core of which processor executes it, the final result is the same. It also includes the design that makes sure that irrespective of which part of state machine is executed in which core of which processor does not make any difference to the final outcome of the traffic for the SNC. This way, if the number of cores in any processor are increased, it increases the number of SNCs that could be restored in parallel and hence the scalability. To achieve all these, the present invention makes different instances of the same protocol stacks to run independently at different cores of different processors and pass along the routing and signaling messages.

In another exemplary embodiment, the SNC processing agents 64 can operate on multiple threads on each processor core 52a-52d. This is a more complex implementation, but offers improved efficiency over running each agent 64 as a single process on each processor. Here, the O/S 62 assigns SNCs 64 to the processor core 52a-52d with the lightest load, balancing the load across the different cores. To achieve parallelism with in each processor core 52a-52d, there are threads to perform different activities of the state machine so that when one thread is waiting for something to happen, the other thread could perform some other functionality of the state machine.

Also these threads could be moved over from one core 52a-52d to another without manual intervention. Advantageously, this provides an advantage when any core 52a-52d in any processor is lightly involved or lightly used in terms of CPU, memory, or any other resource that is needed urgently by the thread, then it could be moved over to such a core from a core that is used heavily. This improves the mesh restoration speed and helps in scalability because irrespective of the number of threads, if the number of cores increases, threads have flexibility in moving around to different cores to get to the final outcome faster.

In yet another exemplary embodiment, the present invention divides the functional area tasks of Call Control in the SNC processing agent 64 (e.g., requests for creates, failures, restores, routing) into different processes. For example, one can deal with physical or logical lines, and another with connections (paths embedded within the line). The present invention puts the line (Up/Down) status together with Call Control, but then divides the Call Control process into a per line threads. The O/S 62 can then divide those processes per processor core 52a-52d. This scales as the number of processor cores 52a-52d scale. Also, the present invention is configured to limit any blocking activities that arise from shared resources.

In the current day technologies, the assignment of threads and cores to perform functional tasks is static in nature. It is decided at the compile time. In the present invention, the assignment of threads and cores is dynamic in nature, i.e. not decided at compile time or build time. The O/S 62 is configured to take care of which core of which processor is free and going to run the thread on such a core and hence the functional tasks are divided between cores of different processors at nul time.

Additional control plane functions, such as signaling and related interfaces, routing connection admission control (CAC), naming and addressing, and the like, can also be utilized in parallel on the processor cores 52a-52d. To achieve the these functionalities, the present invention makes multiple instances of the same protocol run at different processor cores 52a-52d at the same time. For example, the signaling interfaces, CAC, switch core, etc. are changed accordingly.

CAC runs a separate thread which operates over the same data but different instances of the thread at different processor cores 52a-52d can access the same data. This is because there is only a set of time slots available in the switch which is shared between all state machines of SNCs. Signaling interfaces run as a part of control plane and are not tied very closely to establishing cross connects so that the data plane could establish traffic. Here, the control plane gives enough information needed for the data plane and continues to handle other SNCs with data plane functionality running independently in another core 52a-52d. Routing Interfaces are run at all cores 52a-52d since the significant change information from the CAC needs to be given to all cores 52a-52d because any of them could be running the state machine to mesh restore a SNC.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A controller configured for parallel multi-core control plane processing, comprising:
   an external interface configured to receive a control plane request comprising call control for a sub-network connection; and
   one or more processor cores configured to process the control plane request for the sub-network connection through parallel processing, wherein an operating system is configured to operate on the one or more processor cores and to manage the parallel processing of the control plane request sub-network connection, and wherein the parallel processing comprises separately managing a plurality of state machines associated with a control plane and a data plane associated with the sub-network connection on the one or more processor cores;
   wherein one state machine associated with the control plane is at an originating node and controls a state of the sub-network connection as a whole, another state machine associated with the control plane is at one or more nodes through which the sub-network connection passes and ensures that a cross-connection is established or de-established to satisfy the sub-network connection, and the state machine associated with the data plane establishes traffic at each node once the cross-connection is established.

2. The controller of claim 1, wherein the parallel processing comprises running the control plane request for the sub-network connection as a single process on one of the one or more processor cores; and
   wherein the operating system is configured to select the one of the one or more processor cores for the single process.

3. The controller of claim 2, wherein the operating system selects the one of the one or more processor cores based on one of round robin and priority-based.

4. The controller of claim 1, wherein the parallel processing comprises running the control plane request for the sub-network connection on multiple threads of the one or more processor cores.

5. The controller of claim 4, wherein the operating system is configured to assign the control plane request for the sub-network connection to the multiple threads based on loads associated with the one or more processor cores.

6. The controller of claim 1, wherein the control plane request for the sub-network connection comprises functional area tasks of call control; and wherein the parallel processing comprises dividing the functional area tasks into different processes for operation on the one or more processor cores.

7. The controller of claim 6, wherein the operating system is configured to assign the different processes to one or more of the one or more processor cores.

8. A network element configured for parallel multi-core control plane processing, comprising:

a line module;

a switch module interconnected with the line module; and a controller in communication with the line module and the switch module, wherein the controller comprises:

an external interface configured to receive a control plane request comprising call control for a sub-network connection; and one or more processor cores configured to process the control plane request for the sub-network connection through parallel processing, wherein an operating system is configured to operate on the one or more processor cores and to manage the parallel processing of the control plane request of the sub-network connection, and wherein the parallel processing comprises separately managing a plurality of state machines associated with a control plane and a data plane associated with the sub-network connection on the one or more processor cores;

wherein one state machine associated with the control plane is at an originating node and controls a state of the sub-network connection as a whole, another state machine associated with the control plane is at one or more nodes through which the sub-network connection passes and ensures that a cross-connection is established or de-established to satisfy the sub-network connection, and the state machine associated with the data plane establishes traffic at each node once the cross-connection is established.

9. The network element of claim 8, wherein the parallel processing comprises running the control plane request for the sub-network connection as a single process on one of the one or more processor cores; and wherein the operating system is configured to select the one of the one or more processor cores for the single process.

10. The network element of claim 9, wherein the operating system selects the one of the one or more processor cores based on one of round robin and priority-based.

11. The network element of claim 8, wherein the parallel processing comprises running the control plane request for the sub-network connection on multiple threads of the one or more processor cores.

12. The network element of claim 11, wherein the operating system is configured to assign the control plane request for the sub-network connection to the multiple threads based on loads associated with the one or more processor cores.

13. The network element of claim 8, wherein the control plane request for the sub-network connection comprises functional area tasks of call control; and wherein the parallel processing comprises dividing the functional area tasks into different processes for operation on the one or more processor cores.

14. The network element of claim 13, wherein the operating system is configured to assign the different processes to one or more of the one or more processor cores.

15. A method for parallel multi-core control plane processing, comprising:

receiving a control plane request comprising call control for a sub-network connection; and processing the sub-network connection on a multi-core processor, wherein the processing is performed in parallel, and wherein the processing comprises separately managing a plurality of state machines associated with a control plane and a data plane associated with the sub-network connection on the multi-core processor wherein one state machine associated with the control plane is at an originating node and controls a state of the sub-network connection as a whole, another state machine associated with the control plane is at one or more nodes through which the sub-network connection passes and ensures that a cross-connection is established or de-established to satisfy the sub-network connection, and the state machine associated with the data plane establishes traffic at each node once the cross-connection is established.

16. The method of claim 15, wherein the sub-network connection is processed as a single process on one of one or more processor cores; and wherein an operating system is configured to select the one of the one or more processor cores for the single process.

17. The method of claim 16, wherein the operating system selects the one of the one or more processor cores based on one of round robin and priority-based.

18. The method of claim 15, wherein the sub-network connection is processed by running the sub-network connection on multiple threads of one or more processor cores; and wherein an operating system is configured to assign the sub-network connection to the multiple threads based on loads associated with the one or more processor cores.

19. The method of claim 15, wherein the sub-network connection comprises functional area tasks of call control; and wherein the functional area tasks of call control are divided into different processes for operation on one or more processor cores.

20. The method of claim 19, wherein an operating system is configured to assign the different processes to one or more of the one or more processor cores.

* * * * *